United States Patent [19]

Hill et al.

[11] Patent Number: 5,268,021

[45] Date of Patent: Dec. 7, 1993

[54] FLUID FRACTIONATOR

[75] Inventors: Charles C. Hill, Del Mar; Theodore B. Hill, San Diego, both of Calif.

[73] Assignee: Dynotec Corporation, San Diego, Calif.

[21] Appl. No.: 835,918

[22] PCT Filed: Feb. 28, 1992

[86] PCT No.: PCT/US92/01510

§ 371 Date: Feb. 28, 1992

§ 102(e) Date: Feb. 28, 1992

Related U.S. Application Data

[63] Continuation-in-part of Ser. No. 660,177, Feb. 25, 1991, Pat. No. 5,112,367, which is a continuation of Ser. No. 438,786, Nov. 20, 1989, abandoned.

[51] Int. Cl.⁵ ............................................. B01D 53/04
[52] U.S. Cl. .................................. 95/98; 95/130; 95/902; 96/124; 96/130; 96/133; 96/149
[58] Field of Search .................... 55/25, 26, 33, 58, 62, 55/68, 74, 75, 161–163, 179, 180, 189, 196, 387, 389

[56] References Cited

U.S. PATENT DOCUMENTS

| | | | |
|---|---|---|---|
| 2,759,560 | 8/1956 | Miller | 55/180 X |
| 2,955,673 | 10/1960 | Kennedy et al. | 55/33 |
| 3,069,830 | 12/1962 | Skarstrom et al. | 55/179 X |
| 3,104,162 | 9/1963 | Skarstrom | 55/58 |
| 3,138,439 | 6/1964 | Skarstrom | 55/33 |
| 3,182,435 | 5/1965 | Axt | 55/62 X |
| 3,242,650 | 3/1966 | Crawford | 55/62 X |
| 3,323,292 | 6/1967 | Brown | 55/179 X |
| 3,464,186 | 9/1969 | Hankison et al. | 55/163 |
| 3,472,000 | 10/1969 | Glass et al. | 55/163 |
| 3,487,608 | 1/1970 | Graff | 55/179 X |
| 3,572,008 | 3/1971 | Hankison et al. | 55/62 X |
| 3,880,616 | 4/1975 | Myers et al. | 55/62 |
| 4,038,054 | 7/1977 | Graff | 55/179 |
| 4,168,149 | 9/1979 | Armond et al. | 55/179 X |
| 4,209,308 | 6/1980 | Blodgett | 55/179 |
| 4,272,265 | 6/1981 | Snyder | 55/179 X |
| 4,378,982 | 4/1983 | McCombs | 55/179 X |
| 4,428,372 | 1/1984 | Beysel et al. | 55/179 X |
| 4,469,494 | 9/1984 | Van Weenen | 55/179 |
| 4,496,376 | 1/1985 | Hradek | 55/179 X |
| 4,648,888 | 3/1987 | Rowland | 55/25 X |
| 4,713,094 | 12/1987 | Yanagawa et al. | 55/163 |
| 4,787,417 | 11/1988 | Windsor, Jr. | 55/179 X |
| 4,826,510 | 5/1989 | McCombs | 55/179 |
| 4,877,429 | 10/1989 | Hunter | 55/179 X |
| 4,892,569 | 1/1990 | Kojima | 55/163 |
| 4,925,464 | 5/1990 | Rabenau et al. | 55/179 |
| 5,112,367 | 5/1992 | Hill | 55/389 X |
| 5,114,441 | 5/1992 | Kanner et al. | 55/179 X |

FOREIGN PATENT DOCUMENTS

| | | | |
|---|---|---|---|
| 737929 | 7/1943 | Fed. Rep. of Germany | 55/179 |
| 54-136575 | 10/1979 | Japan | 55/179 |
| 63-077516 | 4/1988 | Japan | 55/179 |
| 784150 | 10/1957 | United Kingdom | 55/179 |

OTHER PUBLICATIONS

Nemmies Compressed Air, pp. 11–14 (Sep. 1959).
Breck et al., Chem. Engrg. Prog. pp. 43–53 (Oct. 1977).
Lukchus "Adsorption Systems" Linde Bulletin F-4164, reprinted from Chem. Engrg. (Jun. 11; Jul. 9 and May 6, 1973).

Primary Examiner—Robert Spitzer
Attorney, Agent, or Firm—Brown, Martin, Haller & McClain

[57] ABSTRACT

Improved apparatus for fractionating fluid mixtures by pressure swing molecular adsorption employing a rotary distributor valve and an array of adsorber columns. The columns are, in one embodiment, contained within a product holding tank or, in another embodiment, attached to a product tank. The valve sequences to provide a quasi steady-state flow, allowing optimization of adsorption/desorption cycles, and eliminating most of the valves, switches and plumbing usually required.

41 Claims, 7 Drawing Sheets

FLUID FRACTIONATOR

This application is a continuation-in-part which claims priority under 35 U.S.C. §§ 120 and 365 of U.S. patent application Ser. No. 07/660,177 filed on Feb. 25, 1991, now U.S. Pat. No. 5,112,367, in the name of Charles C. Hill, which application is a continuation of the application filed as U.S. patent application Ser. No. 07/438,786 on Nov. 20, 1989, now abandoned.

BACKGROUND OF THE INVENTION

1. Field of the Invention

This invention relates to an improved apparatus and method for purifying a fluid product by removing certain components of a fluid mixture or contaminants from a source of a single fluid. Since this invention is effective in separation of gases and liquids, depending on circumstances, the term fluid will be used as much as possible. It is understood that the term includes gases and liquids. Although focus is directed to the medical use as a respiratory support in the present embodiment, this invention is also useful in other situations where zeolites and sieve materials are employed, for example oil refinery procedures.

2. Description of the Related Art

The use of selectively adsorbent molecular sieve materials having uniform pore sizes in separation of fluid components has been in practice since about 1948, with the first industrial research efforts occurring at Union Carbide Corporation. Based on the first experimental observations of the adsorption of gases on naturally occurring zeolites and the behavior of the latter as molecular sieves by Barrer in 1945 (J. Soc. Chem. Ind., 64:130), Milton and coworkers at Union Carbide synthesized the first industrial zeolite molecular sieves in 1948 (R. M. Milton, Molecular Sieves, Soc. Chem. Ind., London, 1968, p. 199), and they were test marketed in 1954.

Most separations of fluid mixtures by adsorption require regeneration of the adsorbent after saturation with the adsorbate. Since most separations are performed on fixed-bed columns, complex mechanisms involving intricate networks of interconnected and interoperating valves and switches have been devised to implement adsorption and desorption cycles in order to facilitate regeneration.

Costly and elaborate equipment like that described above is suitable for large scale commercial operations where the equipment is constantly monitored by competent technicians. However, in dealing with the problem of supplying relatively small quantities of oxygen to patients, especially at home, size, ease of operation and, even more importantly, reliability are the primary concerns.

The use of synthetic molecular sieves in a two-bed, pressure swing adsorber for separation of oxygen from air for medical and industrial applications became commercially practical in the early 1970's and many manufacturers now build such equipment.

The components in a typical two column system currently available are:
Air compressor
Heat exchanger
Air receiver or surge tank
Two molecular sieve chambers
Two pressure dropping orifices
Product tank (oxygen receiver)
Four or five two-way solenoid operated directional flow control valves (or, alternatively, one 4-way valve and one 2-way valve)
Electrical or electronic sequencing timer control for the valves
Pressure reducing regulator for oxygen product flow
Intake and exhaust silencers
Intake and product filters
Adjustable flow control valve for oxygen product flow
Connecting tubing and fittings to conduct fluid flows into and out of components The above list of components clearly indicates the complexity of a typical medical oxygen concentrator (or respiratory support system), requiring a network of interconnected parts acting in concert. This complexity can give rise to the prospect of decreased reliability, and the chance that some component will malfunction, or a connection leak will develop, rendering the entire apparatus incapable of performing its life-support function.

The compressor discharge profile in a two column system, when plotted against time manifests a "sawtooth" pattern which is responsible for shortening compressor valve and bearing life, requiring an air receiver or surge tank to limit such fluctuation. This cyclic flow in the two column adsorber also produces large pressure variations in product gas flow, requiring the use of a pressure reducing regulator in the dispensing conduit. The abrupt, large pressure changes also require extensive silencing.

Furthermore, to provide an ambulatory patient with acceptable mobility and quality of life, a supplementary oxygen supply system must be reliable, economical, compact, portable and light in weight. The instant invention provides a system which addresses all these parameters.

SUMMARY OF THE INVENTION

This invention encompasses improved apparatuses for fractionating a fluid mixture by pressure swing molecular adsorption. These apparatuses contain a plurality of adsorber columns and a chamber functioning as a purified product holding tank.

The heart of the apparatuses are unique, rotary distributor valve assemblies for sequentially pressurizing and exhausting each column. This allows pressurization of one of the columns while simultaneously purging the adsorbent medium in another of such columns.

This invention further encompasses improved processes for removing fluid components by selective adsorption of particular fluids from a stream of a mixture of fluids or a contaminating fluid component from a stream of a single fluid.

An incoming stream of a pressurized fluid mixture is sequentially distributed by means of rotating members of the rotary distributor valves of the alternative embodiments disclosed herein into a plurality of columns packed with an adsorbent which is selective for the fluid or the contaminant fluids to be removed. The contaminants are retained by the adsorbent and the desired product fluid is allowed to pass through. By simultaneously refluxing product fluid under low pressure, through columns other than columns being pressurized, the contaminant is desorbed and exits the system.

Novel, smaller, smoother in operation, simpler and more reliable apparatuses for providing supplementary oxygen to patients are presented below as exemplary embodiments of the instant invention. Improved methods of fractionating fluid mixtures, which arise out of judicious use of the described apparatuses, are also presented.

DESCRIPTION OF THE PREFERRED EMBODIMENTS

Figure 1:
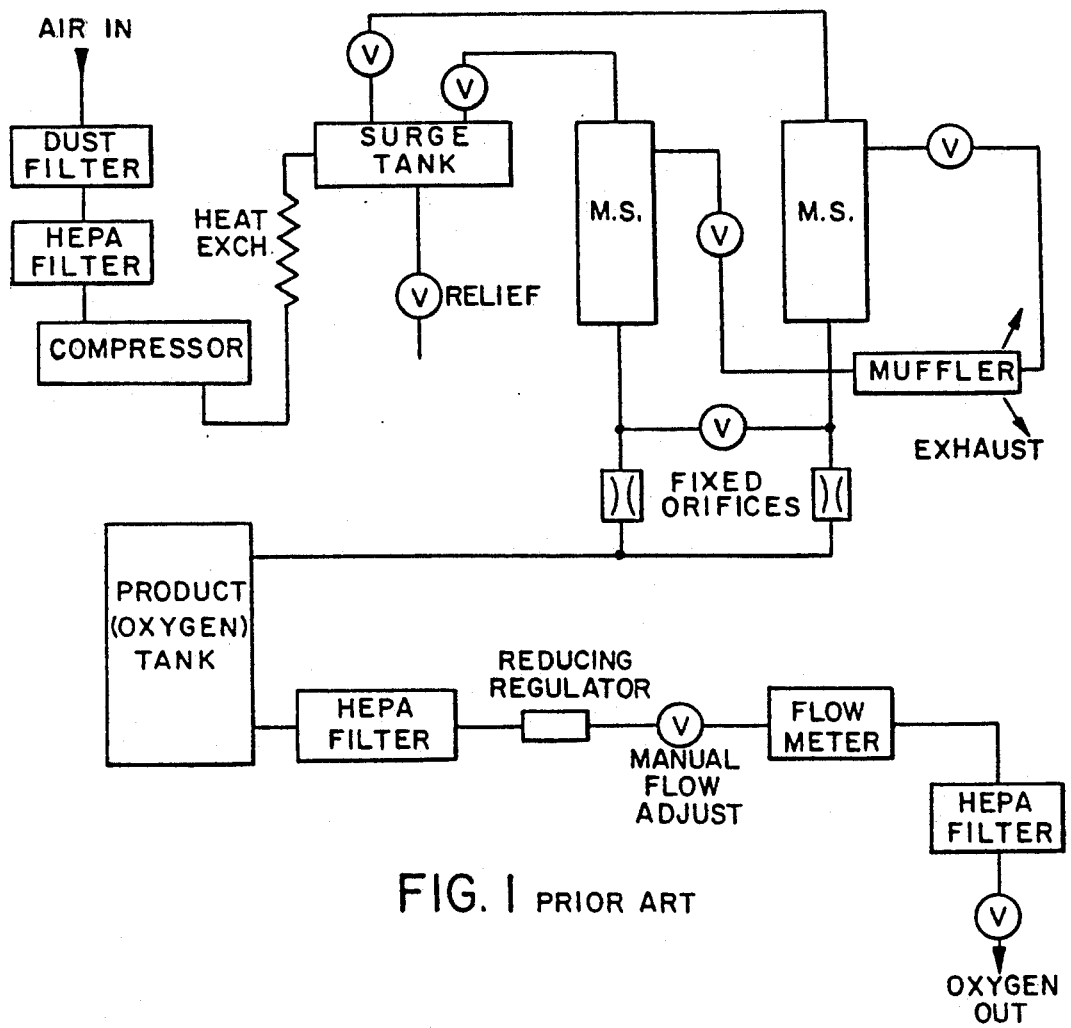
FIG. 1 depicts schematically a typical two-column adsorbent fractionating prior art system commercially available.

FIG. 1 depicts schematically a typical small two-column oxygen concentrator commercially available for patient use. It can readily be seen from the schematic diagram that a typical medical oxygen concentrator is a complex machine, with a multitude of interconnected and interacting parts. Attendant with this manifold complexity is the prospect of decreased reliability, or the increased chance that some component will fail, rendering the entire apparatus incapable of performing its life-supporting function.

Figure 2:
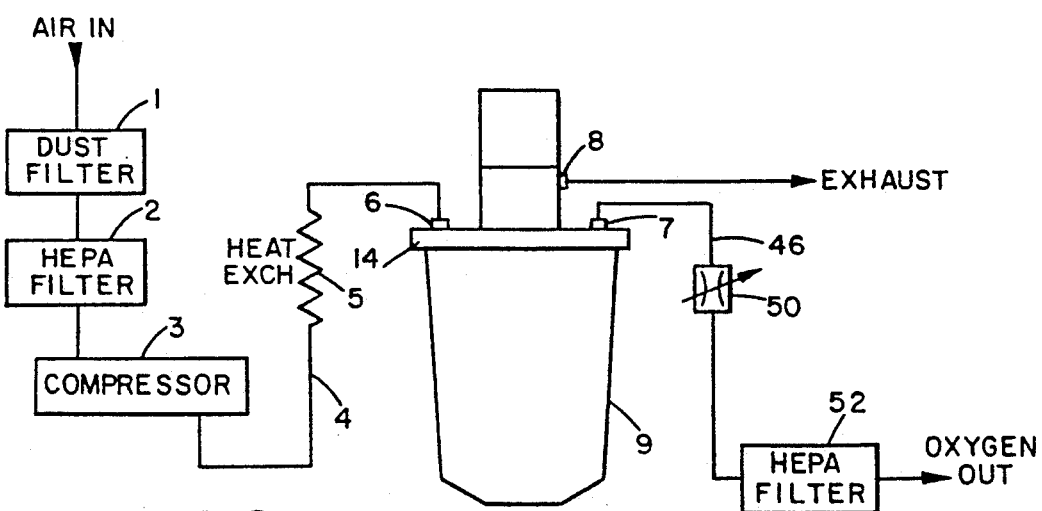
FIG. 2 is a schematic representation of one embodiment of the entire fluid fractionator respiratory support system of the instant invention.

One embodiment of this invention, with its unique design which requires far fewer parts, will be described by following a volume of mixed fluids (air in this case) as it moves through the fractionation procedure. In FIG. 2, ambient air is drawn in through a pair of filters, one dust 1 and one high efficiency particle arrestor (HEPA) 2 connected in series, by a compressor 3. The air is compressed and forced within a conduit 4 into a heat exchanger 5. (It should be noted that the filters shown in both FIGS. 1 and 2 could follow, rather than precede, the compressor). The heat exchanger removes most of the heat of compression before the air is fed into the inlet port 6 of the fluid fractionator. The cooling air in the exchanger is provided by a fan mounted on the compressor shaft, thereby, obviating the requirement of an additional motor and energy source. After most of the nitrogen is removed by the adsorber columns of the fractionator, an oxygen-rich fraction is tapped off through an outlet port 7 to the dispensing conduit, while the desorbed nitrogen is purged by the balance of the oxygen-rich product flow and leaves through an exhaust port 8.

Figure 3:
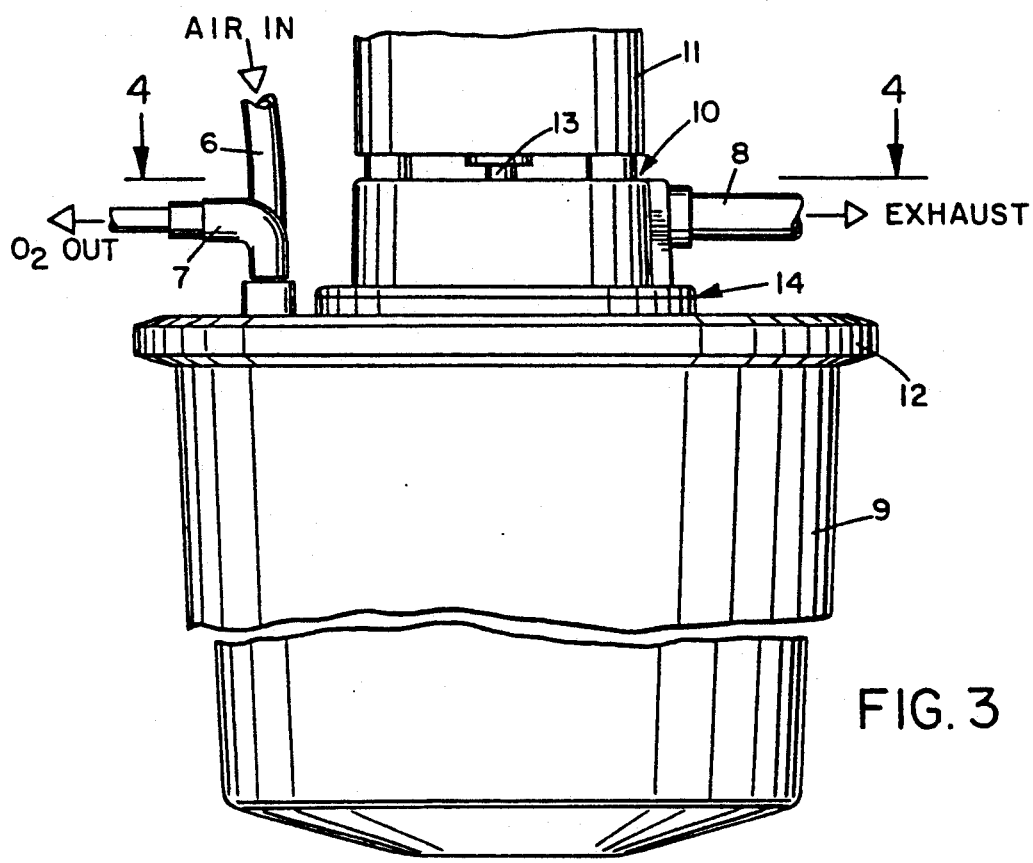
FIG. 3 is a side elevation view of the apparatus which is the subject of FIG. 2.

The fluid fractionator, in FIG. 3, comprises a product holding tank 9 containing a cluster or array of adsorber columns within its housing, a rotary valve distributor 10 and a gear motor 11 having a drive shaft 13.

Figure 4:
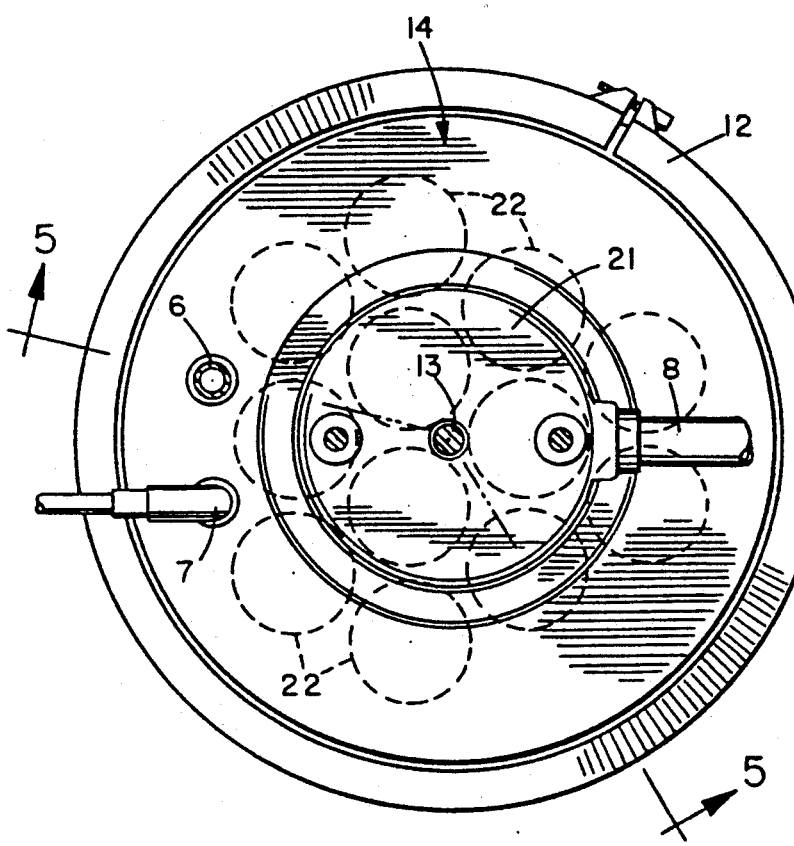
FIG. 4 is a view taken on line 4—4 of FIG. 3.

FIG. 4, a view taken on line 4—4 of FIG. 3, shows the arrangement of an array of columns 22 within the holding tank relative to the inlet 6, outlet 7 and exhaust 8 ports of the rotary distributor valve assembly, which is affixed to the holding tank by means of a clamp band 12. Twelve columns are shown in this case but there could be any number of two or more.

Figure 5:
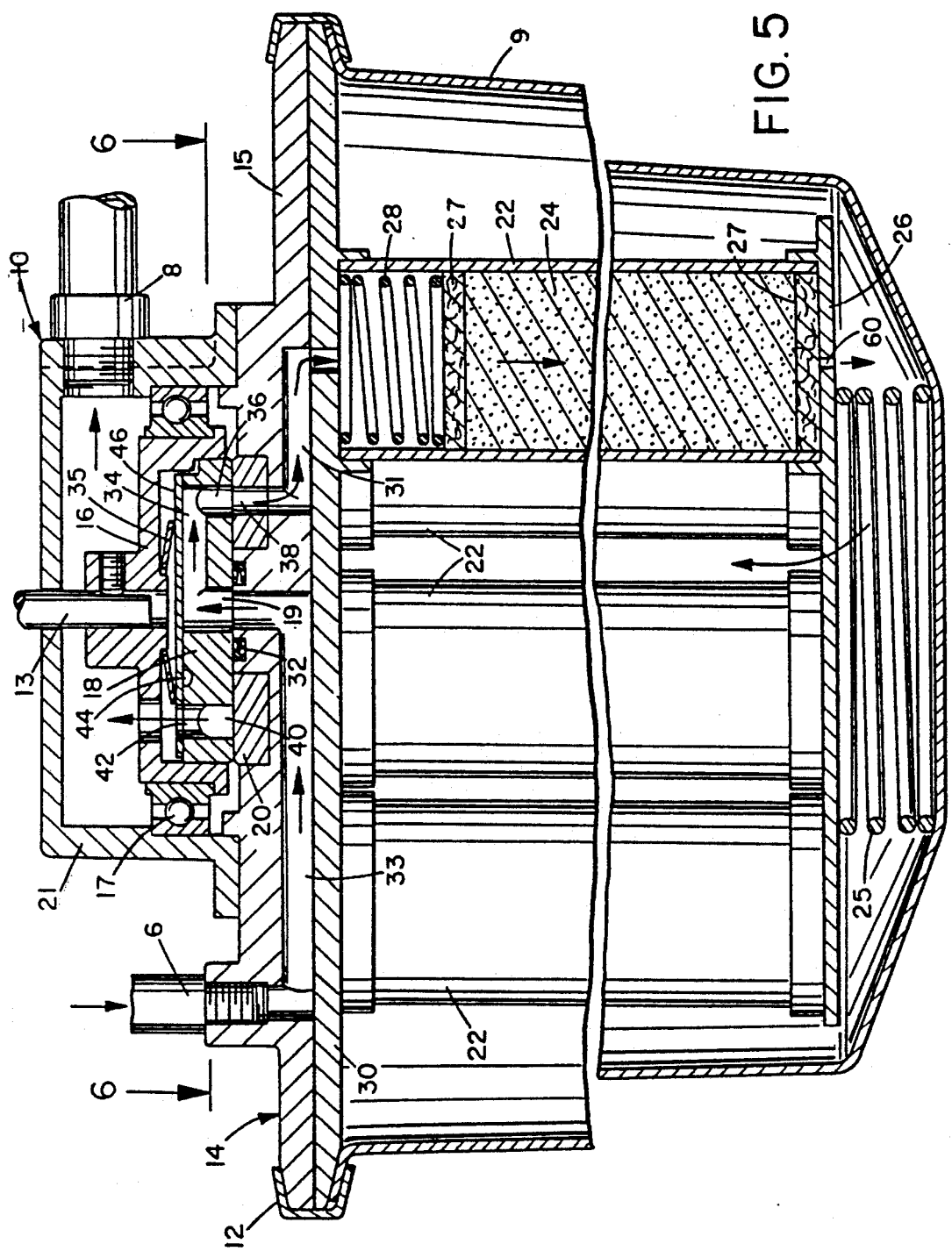
FIG. 5 is an enlarged sectional view taken on line 5—5 of FIG. 4.

The rotary distributor valve depicted in FIG. 5, which is an enlarged sectional view taken on line 5—5 of FIG. 4, comprises a ported and channelled two-piece manifold 14 and a rotor 16 with a ported rotor shoe 18 and a cover plate 46, the rotor 16 being driven by a gear motor 11 (FIG. 3) at about two revolutions per minute, with the rotor 16 turning in circumferential ball bearing unit 17. Conical disk or Belleville spring 35 urges cover plate 46 and rotor shoe 18 downward to secure them in position. The rotor 16 and its associated components are enclosed by cover 21, which is attached to manifold 14.

Following the arrows indicating fluid flow direction, the two-piece manifold 14 contains a top section 15 which is ported and channeled to take in a stream of fluid through the inlet port 6 and channel it through an air feed passage 33 into a centrally located inlet port 19 in the rotor shoe 18, and subsequently to channel the fluid mixture exiting the rotor shoe radially from a circular array of inlet ports located in the port plate 20 towards each column 22 of an array of columns arranged about the center of the manifold. Each of these columns contains a bed of adsorbent material 24 (zeolite in this case) which is selective for a particular molecular species of fluid or contaminant. The packed bed is held in place by a plate 26 at the bottom which is supported by spring 25, and perforated plates 27 at top and bottom with a spring 28 at the top. The bottom plate has a pressure-dropping means such as a small orifice 60, the diameter of which is empirically determined, at the center of each column.

The bottom half of the manifold, which is also an upper column header plate 30, affixed to the top half of the manifold by means of a clamp band 12, acts as a cover for the channels and has the array of columns attached to its underside. The channels in the manifold are sealed by a gasket or sealing compound.

Recessed into the top of the manifold, coaxial to the exit port of the air feed channel 33, sealed and immobilized by means of a slot and key, is the port plate 20 which contains a number of holes in an equally spaced circular pattern, equal in number and aligned with the circular distribution of entry ports of channels to individual columns in the manifold. The manifold has a groove machined into its upper surface, just inside the port plate, which contains an air inlet rotary seal 32. The port plate is made from a suitable hardened material.

The other major component of the rotary distributor valve is a gear motor-driven rotor 16 containing a ported rotor shoe 18, which slides over the rotor plate (FIGS. 5, 6, 7, and 8 all depict various aspects of the rotor/shoe). The rotor shoe is made from material known in the art to be suitable for use with the hardened material comprising the port plate, and is held in position over the rotor plate by spring-loaded or pressure compensated means. Shown is a conical or Belleville pressure compensating spring to counteract supply pressure. An arrangement of small coil springs can also be utilized for this purpose.

Figure 6:
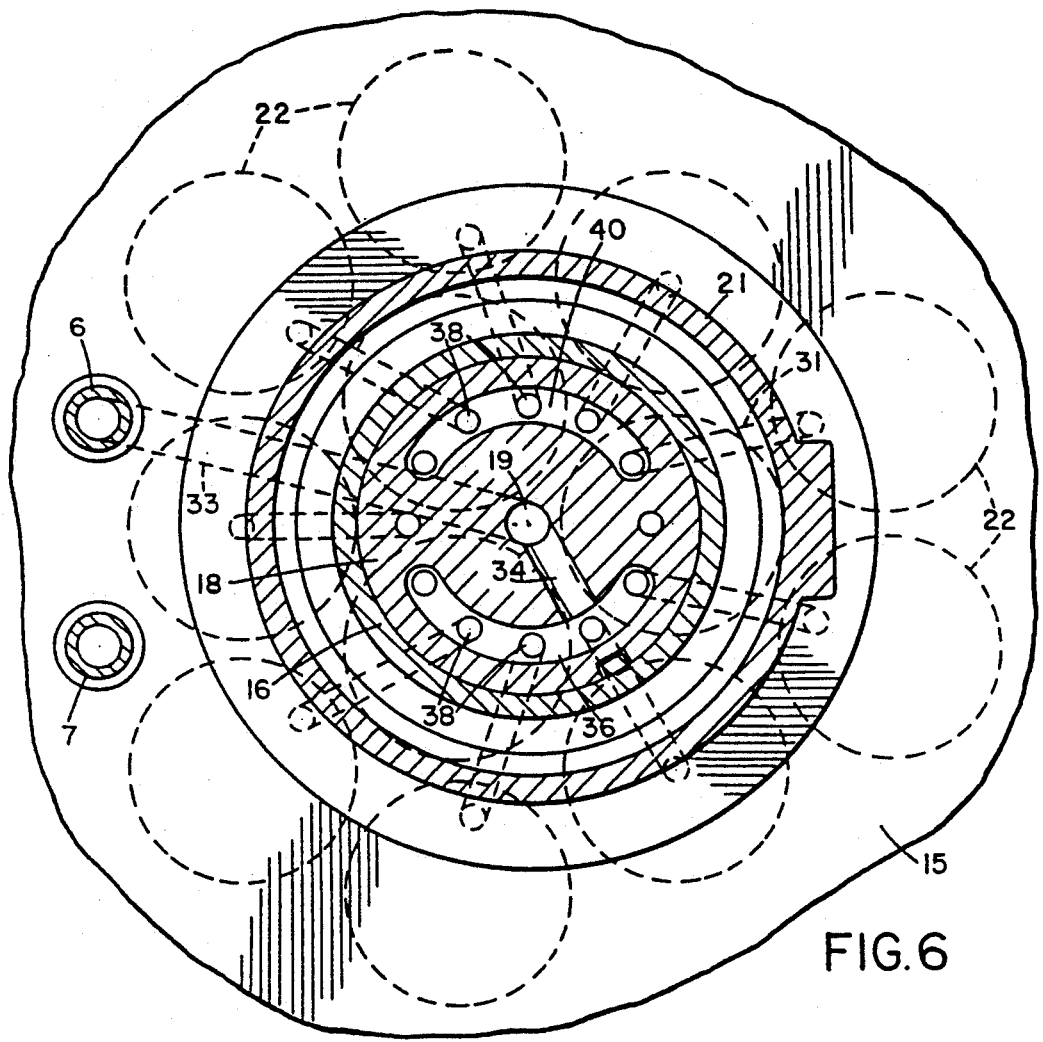
FIG. 6 is a sectional view taken on line 6—6 of FIG. 5.

In the rotor shoe, there are three channels. One channel is a pressurizing channel or air feed passage 34 originating at the central fluid inlet port 19, and radiating into an arcuate slot 36 to simultaneously serve as a conduit into several of the circularly positioned ports in the port plate. As the rotor shoe turns, each new port appearing in the slot is pressurized, and the port at the other end of the slot passes out of the slot and is depressurized. Full system pressure is maintained at all intermediate ports. FIG. 6, a sectional view taken on line 6—6 of FIG. 5, shows the relationship of the arcuate air feed port or slot 36 of the rotor shoe 18 and the receiving ports 38 in the port plate, as well as the air feed channels 31 to each of the columns 22.

In another channel, the wide exhaust port 40 collects refluxed fluid impurities desorbing and exiting from the columns, and channels them out through an exhaust outlet 8 (FIG. 5), through a "silencer" and into the atmosphere.

Figure 7:
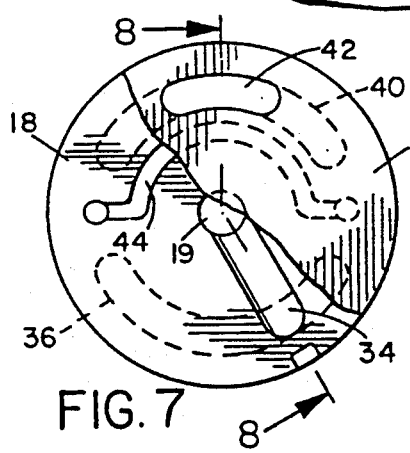
FIG. 7 is a top plan view, partially cut away, of the rotor shoe, of the embodiment depicted in FIG. 2.

FIG. 7 is a top plan view, partially cut away, of the rotor shoe. Several other features come into view here. The desorbed columns are vented upward through the exhaust slot 40, through a vent 42 in the rotor shoe cover plate 46, into the rotor void space, and out through the exhaust port 8 (FIG. 5).

The third channel is a cross-port channel 44 which serves as a conduit between two columns which are in transition between the pressurizing and desorbing phases of a cycle. Its purpose is to quickly equalize pressure in columns transitioning between the adsorbing and desorbing cycles. This feature enhances product concentration at high product flow rates.

The purge flow rate is the rate at which the purging fluid flows countercurrent to adsorption during regeneration of the columns. There is an optimal purge rate for maximal removal of nitrogen during regeneration. A very high purge rate causes the pressure within a bed to be greater than atmospheric, resulting in reduced desorption efficiency. The cross-porting channel in the rotor shoe allows a pressure drop in the column bed before it enters the desorption cycle. This prevents a very rapid decompression and thus excessively high initial purge flow. This effect is easily measurable by simple instrumentation; however, its basis at the molecular level is not understood.

Figure 8:
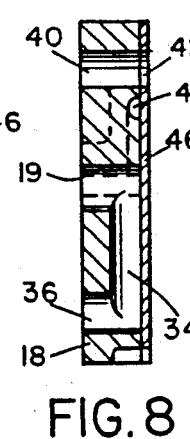
FIG. 8 is a sectional view taken on line 8—8 of FIG. 7.

FIG. 8 is a sectional view taken on line 8—8 of FIG. 7, showing the routing of the pressurizing 34, cross-porting 44 and exhausting 40 channels in the rotor shoe 18.

Figure 9:
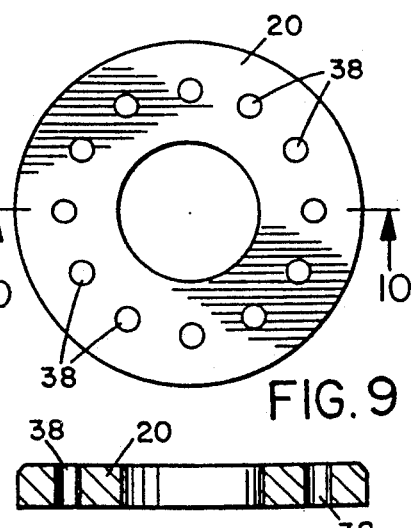
FIG. 9 is a top plan view of the port plate of the embodiment depicted in FIG. 2.
Figure 10:
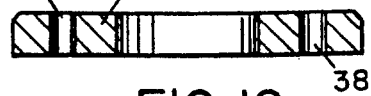
FIG. 10 is a sectional view taken on line 10—10 of FIG. 9.

FIG. 9 is a top plan view of the port plate showing the circular location of ports of channels leading to each of the array of columns, and FIG. 10 is a sectional view taken on line 10—10 of FIG. 9.

Figure 11:
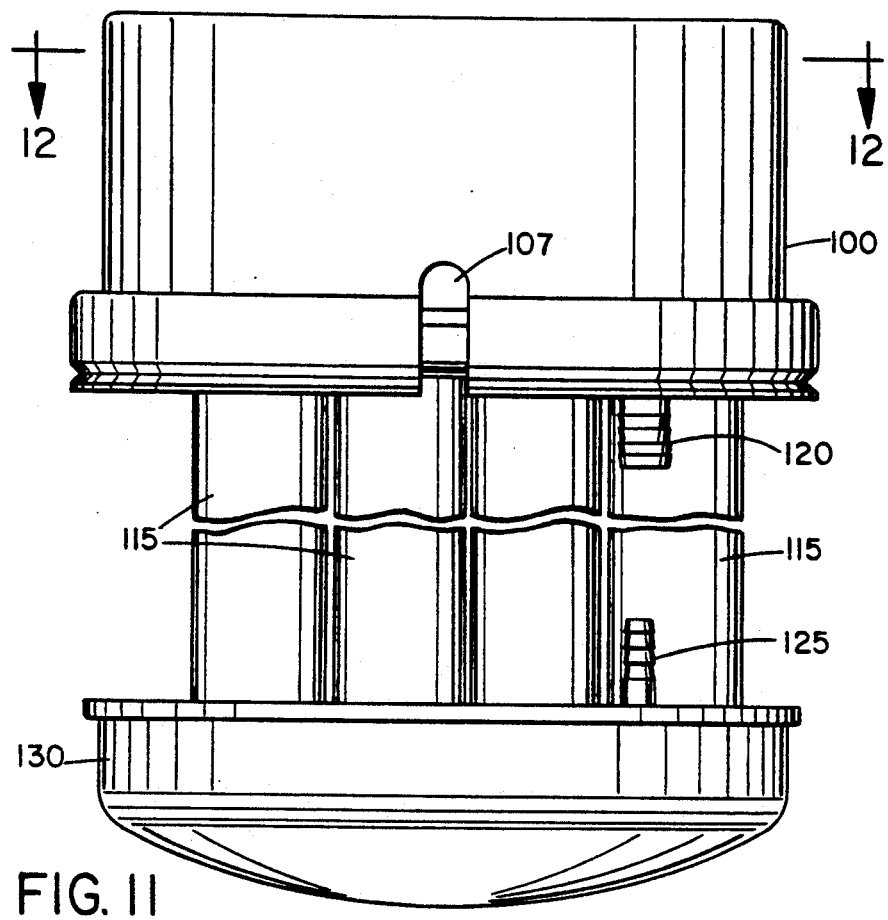
FIG. 11 is a side elevational view of an alternative configuration of the unit.
Figure 12:
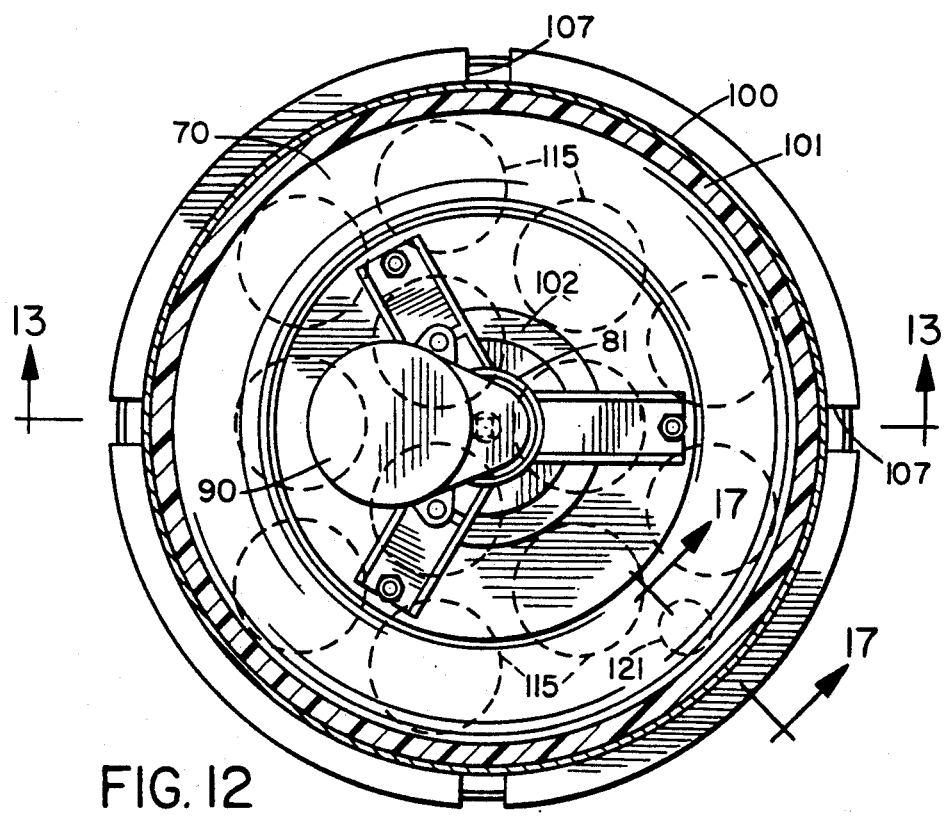
FIG. 12 is a sectional view taken on line 12—12 of FIG. 11.

FIG. 11 depicts an alternative embodiment of the apparatus of this invention, with a sectional view taken on line 12—12 thereof shown in FIG. 12. This latter view shows an array of adsorber columns similar to the columns 22 depicted in FIG. 4. As in FIG. 4, twelve columns are the preferred number shown in the embodiment of FIG. 12, but there could be any number of two or more. It should be noted, however, that a length to diameter ratio of greater than 6:1 for the adsorber columns is preferred with the only limit on length being a practical one. This ratio permits the adsorption medium to be retained within the columns without the use of springs to compress and retain the adsorption media therein. At least one layer of filter media must, however, be present at each end of the column to avoid loss of adsorption medium through the inlet and outlet orifices to and from the columns. A cap 165 will be mechanically seated over the distal end of each of said columns, through which outlet orifice (not shown) to product tank 130 (FIG. 13) extends.

Figure 13:
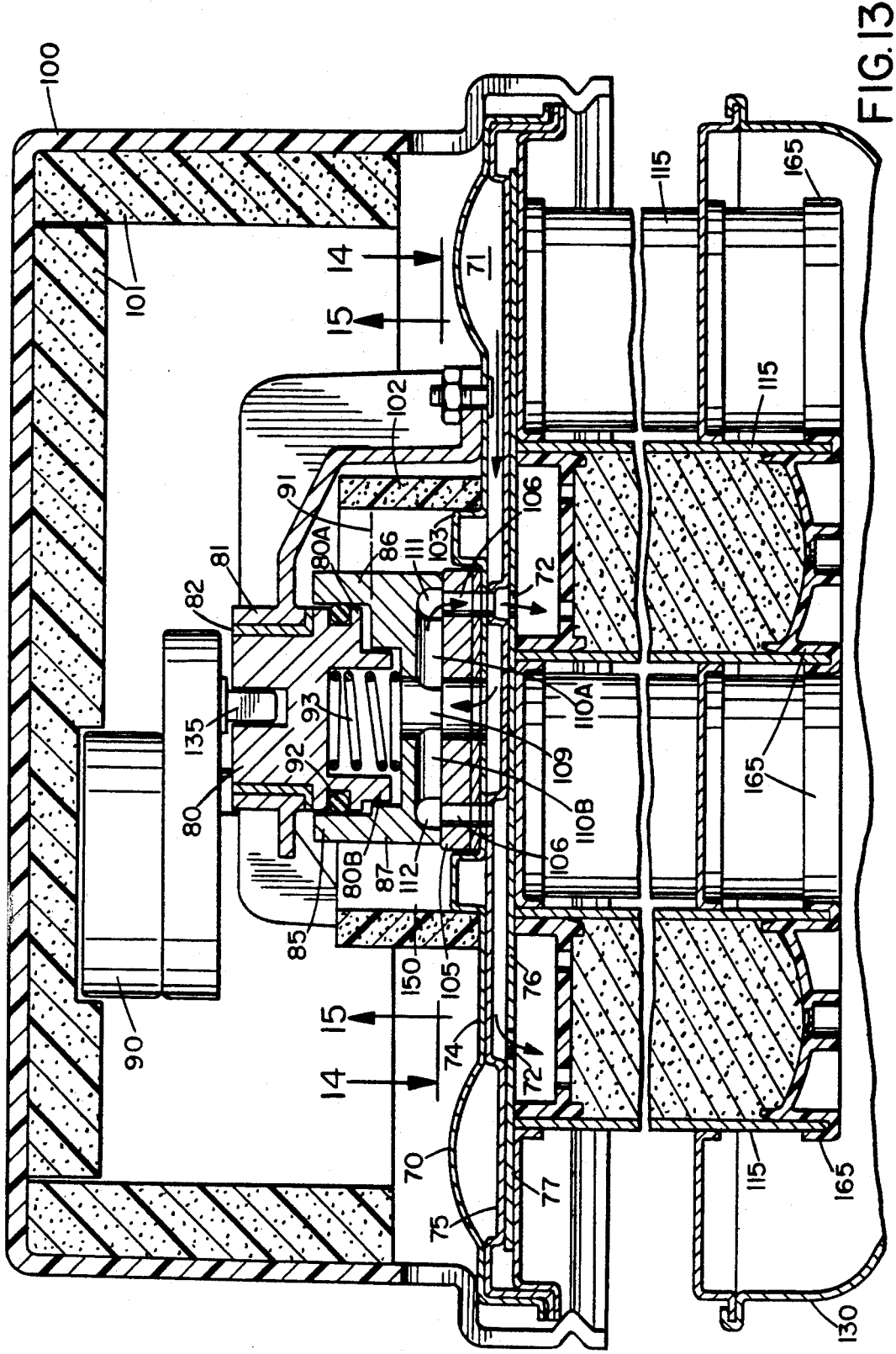
FIG. 13 is an enlarged sectional view taken on line 13—13 of FIG. 12.

The rotary distributor valve depicted in FIG. 13, which is an enlarged sectional view taken on line 13—13 of FIG. 12, comprises a manifold 70 which is formed from one or more layers of aluminum, which layer or layers are pierced, and/or die formed or embossed and then, if a multiplicity of layers is used, sealed in a stacked configuration (by lamination or equivalent means) to form fluid channels. Four layers of aluminum (74, 75, 76 and 77) are shown in FIG. 13; it will be appreciated, however, that one or more layers of any lightweight, rigid, low density material (such as a-b-s resin plastic) may be used.

The rotary valve further comprises a rotor shaft 80 rotatably retained within bearing housing 81 via flanged bearing 82 and within rotor shoe 85. Rotation of rotor shaft 80 is permitted by the presence of O-ring 92 around its circumference. Rotor shaft 80 is driven by gear motor 90 via motor shaft 135 at about one revolution per minute. As depicted in FIG. 13, said rotor shaft 80 is concentrically shaped above line 91 and eccentrically shaped below line 91. The eccentric shape is achieved by enlarging the lateral thickness of side wall 80A of rotor shaft 80 with respect to side wall 80B.

Rotor shoe 85 comprises a ported disc (similar in structure and composition to rotor shoe 18 depicted in FIG. 7) with raised side walls 86 and 87 which define a circular chamber into which rotor shaft 80 is seated. Rotor shoe 85 is driven by torque exerted by rotor shaft 80 when the latter is driven by gear motor 90. Compression spring 93 assists in sealing the shaft and shoe, thus maintaining the seal even when the apparatus is not in operation and compensating for wear experienced by the shaft and shoe. Use of this configuration to form a pressure balanced seal requires less torque to turn the rotor, and thus less energy to operate the system than required by prior art systems or the embodiment of FIGS. 3–10.

The pressure balanced seal between the rotor shaft and shoe is a function of the integrated pressure exerted on the surface of the rotor shoe between it and the rotor shaft during operation of the apparatus and the diameter of the rotor shaft. During operation, the fluid pressure at fluid inlet port 109 at the start of adsorption multiplied by the diameter squared of the rotor shaft (below line 91) and by $\pi/4$ is equal to the force exerted to form a seal between the shaft and shoe. As a result of this relationship, the shaft and shoe will remain sealed and balanced with respect to each other even if the fluid pressure at fluid inlet port 109 varies. It should be noted that there is a passage (not shown) from port 109 through to the interface surface between rotor shaft 80 and rotor shoe 85 which serves to pressurize the interface to help maintain the pressure balanced seal.

This apparatus also features an enhanced noise control design. As shown in FIG. 13, said noise control design comprises muffler housing 100, having inner and outer surfaces preferably formed by a flexible plastic, which snaps over manifold 70 to form a cover for the manifold and rotary valve distributor. The noise control design further consists of pieces of acoustical foam or equivalent acoustical attenuating material placed within the apparatus as follows: at 101, said foam conforms topographically, in one or more pieces, to the inner surface of muffler housing 100. At 102, acoustical foam is seated vertically between bearing housing 81 and manifold 70. Said foam 102 may be retained in place by a portion of layer 74 of manifold 70 formed to provide a stop 103 between foam 102 and port plate 105.

In operation, sound waves emitted by the operation of the rotary valve distributor escape from exhaust ports 113 and 114 in the rotor shoe into the annular air space 150 between the shoe and acoustical foam 102. Those sound waves not dissipated by striking foam 101 and 102 eventually escape from slots 107 in the walls of muffler housing 100. The noise control design would, therefore, be considered in the art as a reactive muffler.

Figure 14:
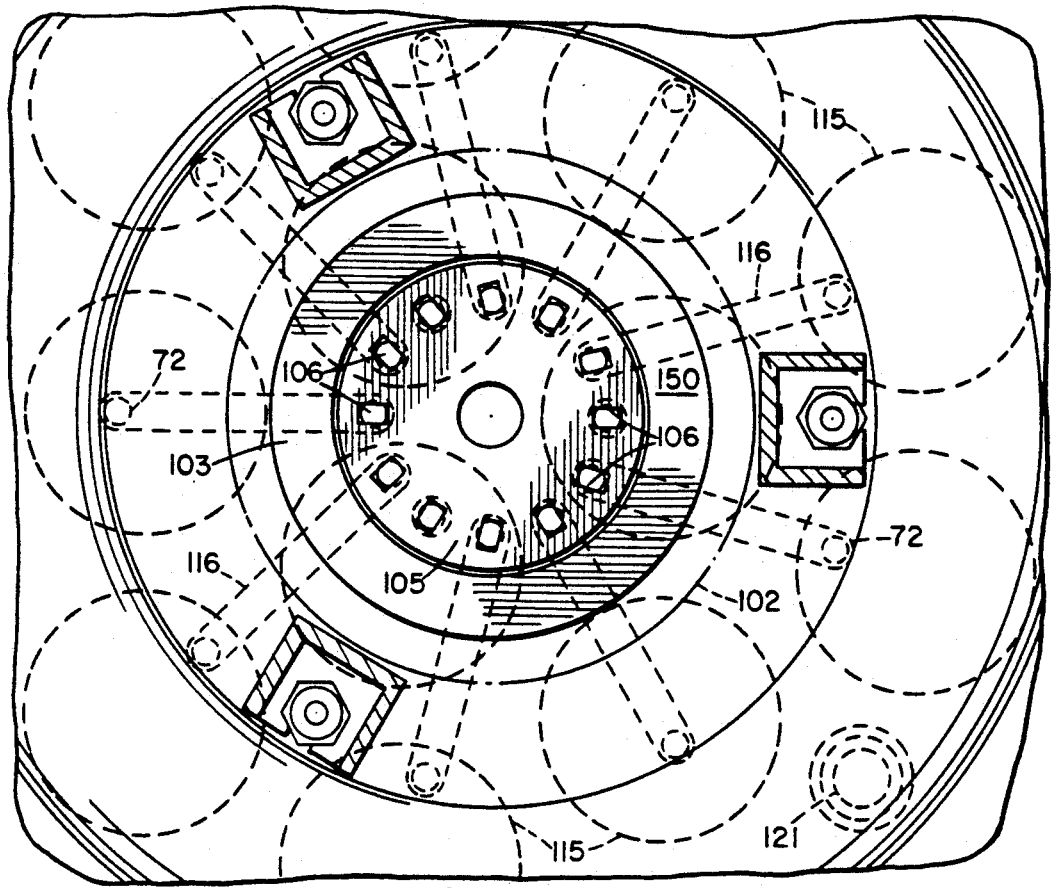
FIG. 14 is a sectional view taken on line 14—14 of FIG. 13.

Recessed into layer 74 of manifold 70 is port plate 105. Port plate 105 is similar in structure to port plate 20 of the embodiment depicted in FIG. 5, except that, while the inlet ports therein to the adsorber columns (one port per column) may be of any shape, they are preferably in the shape of wedges and most preferably in an arched keystone shape which will circumscribe the orifices 160 leading into the columns 115 via air fed channels 116 and ports 72 (FIG. 14). Wedge-shaped inlet ports are best depicted at 106 of FIG. 14, which is a sectional view taken on line 14—14 of FIG. 13.

Figure 15:
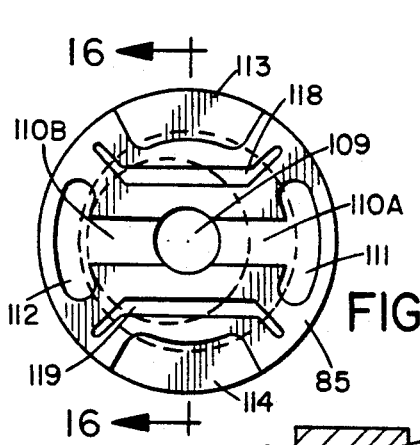
FIG. 15 is an underside view of the rotor shoe as taken on line 15—15 of FIG. 13.
Figure 16:
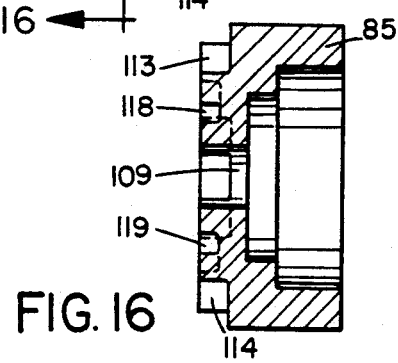
FIG. 16 is a sectional view taken on line 16—16 of FIG. 15.
Figure 17:
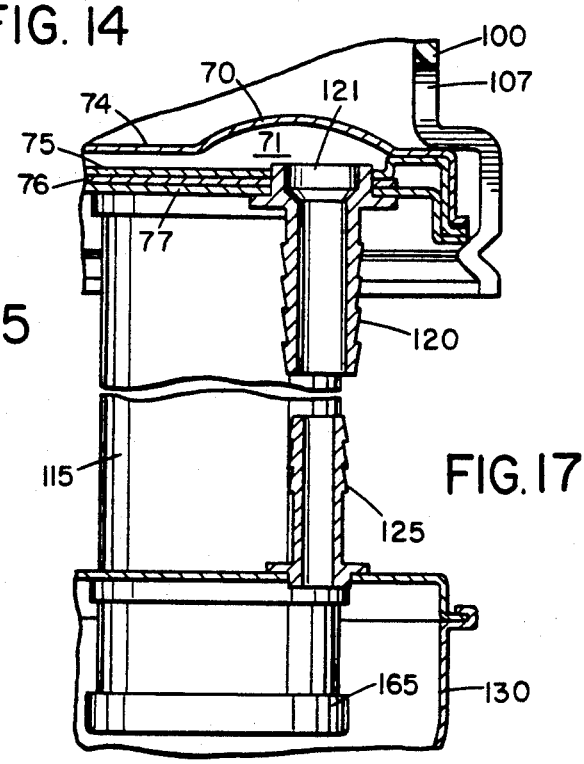
FIG. 17 is an enlarged sectional view taken on line 17—17 of FIG. 12.

As in the embodiment of the apparatus shown in FIGS. 3–10, fluid is directed to the inlet ports 106 in port plate 105 for passage to the adsorber columns via channels in the rotor shoe. As best depicted in FIG. 15, rotor shoe 85 comprises three sets of channels. The first set of channels consist of pressurizing channels 110A and 110B which extend respectively and radially from central fluid inlet port 109 to symmetrical air feed ports 111 and 112 (while two air feed ports are shown, it will be appreciated that more than any number of two or more may be used as long as the ports are arranged in axial symmetry about inlet port 109). In terms of direction of flow, fluid travels through fluid inlet port 109 to air feed ports 111 and 112 through ports 106 in port plate 105 to air feed channels 116 (shown in FIG. 14) Which lead from each port 106 via ports 72 and 160 to an adsorber column (shown in sectional view in FIG. 14 at 115).

The second set of channels consist of at least two exhaust ports (113 and 114 in FIG. 15) which will be equal in number to air feed ports 111 and 112 and will also be arranged with axial symmetry with respect to inlet port 109. The desorbed columns are vented upward through exhaust ports 113 and 114, to annular air space 150 and eventually to the atmosphere via slots 107 in muffler housing 100 (FIG. 13).

The third set of channels are at least one pair of symmetrical cross-port channels 118 and 119 (equal in number to air feed ports 111 and 112). These channels serve to quickly equalize pressure between columns transitioning between the adsorption and desorption phases much in the same manner as does the single cross-port channel 44 depicted in FIG. 7.

The number and symmetry of shape and size common to each set of channels avoids the preloading spring which results from the use of asymmetrical ports, where variances between the fluid pressure present at the air feed and exhausts ports may push the rotor shoe against the port plate during operation.

Excepting the points of difference described above, the apparatus of FIGS. 11–17 is substantially similar to the apparatus of FIGS. 3–10.

The preferred method of fractionating air to provide an oxygen-rich air supply to a patient is described below.

Fractionation Method

At this point it is reiterated that although air fractionation is described, the method is effective in fractionating other fluids.

In the embodiment of the apparatus of FIGS. 3–10, the method of fractionation is as follows: compressed air enters the inlet port 6 of the manifold (FIG. 6) and is channeled through the air passage in the manifold 33 communicating with the rotor shoe 18 and then into the arcuate pressurizing slot 36 to enter sequentially into several ports 38 in the port plate as the rotor shoe 18 turns. As these ports become pressurized, the gas mixture enters, pressurizes and flows through each attached column 22 where the separation takes place.

Referring now to FIG. 5, the desired gas, oxygen in this case, is free to move through the zeolite adsorbent bed 24 (e.g., similar to that provided by the molecular sieve division of UOP), while the undesired gases and vapor (nitrogen plus $CO_2$, CO, $H_2O$) are retained, because of their molecular size and the relatively high pressure and low temperature, in the matrix of the adsorbent bed.

The purified desired gas product (oxygen) moves out of the column through a pressure-dropping means such as a small orifice 60 or a fluid porous plug in the bottom of the column and into the circumscribed product tank 9. From the product tank, a relatively small portion of the oxygen is tapped off by the distribution system conduit at the outlet port 7 (FIG. 6) for use by the patient, and another, relatively large, portion enters the columns in the opposite bank, which are under nearly atmospheric pressure, through corresponding small pressure dropping/flow restricting orifices in the bottom to reflux through the bed in a direction opposite to gas flow during pressurization. The amount of product used to purge versus the amount delivered by the distribution system can vary, depending on the degree of product purity desired. This backwash of product gas at pressure lower than the adsorbing cycle removes the contaminant embedded in the zeolite matrix, in this case nitrogen, and flushes it out through the top of each column into the manifold 14, the port plate 20 and through the rotor shoe 18 and exhaust outlet 8 into the atmosphere via a silencer or muffler.

Referring back to FIG. 2, the tapped oxygen-rich product gas then moves within a dispensing conduit 46 through a manually controlled valve 50 with a flow meter, through a final filter (HEPA) 52 and to the dispensing terminus.

In the embodiment of the apparatus shown in FIGS. 11–17, the method of fractionation is as follows: compressed air enters the manifold from inlet conduit 120 through inlet port 121 (FIGS. 14 and 17) and is channeled through channel 71 communicating with the rotor shoe 85 via central fluid inlet port 109. The air then passes through radial channels 110A and 110B to inlet ports 111 and 112. As the rotor shoe turns over port plate 105, inlet ports 111 and 112 will each become aligned with an equal plurality of wedge-shaped ports 106, thus allowing the air to enter the columns 115 via air feed channels 116 corresponding with each plurality of ports 106 served respectively by inlet ports 111 and 112. Adsorption occurs within the columns as described above.

The purified product is retained within product tank 130 after exiting the column via pressure-dropping means such as orifice 60 depicted in FIG. 5. Product tank 130 (FIG. 11) differs from product tank 9 (FIG. 5) in that tank 130 is smaller in volume and does not surround columns 115 except at their distal ends; i.e., opposite manifold 70. This smaller product tank (vis-a-vis product tank 130 [FIG. 11]) reduces the overall weight of the system. As will be understood by those skilled in the art, the limits on reduction of the size of product tank 130 are practical ones, principally dictated by storage needs and the volume required to regulate the output pressure of the system sufficiently well to reduce the need for a pressure regulator.

Product is tapped for use by the operator or patient via outlet conduit 125. The system is then purged as described above with respect to the method used with the apparatus depicted in FIGS. 3-10.

In both embodiments and methods described above, when the motor is operated at the specified speed (i.e., 1 revolution per minute for the embodiment of FIGS. 11-17 and 2 revolutions per minute for the embodiment of FIGS. 3-10), and the inlet and exhaust ports in the rotor shoe are equal in size, the cycle profile is such that each column is pressurized for approximately 12.5 seconds, equilibrated for 2.5 seconds, and desorbed for 12.5 seconds and re-equilibrated. This profile of the cycle is obtainable only when the intake and exhaust slots in the rotor shoe are equal in size, and service an equal number of columns. The profile can be altered as desired by varying the size of the respective inlet and exhaust ports. This is a desirable feature which cannot be put into effect in any of the prior art mechanisms.

As the rotor rotates over the rotor plate, this cycle is sequentially and continuously established for each column. This mode of operation produces a relatively constant flow of product, improving with a greater number of columns, eliminating the need for a pressure reducing regulator. The average product outlet pressure is nearly constant and about twice the regulated delivery pressure of prior art fractionators.

Some other advantages of the present invention are outlined hereunder. Because of the large number of relatively small diameter adsorber columns, the column length may be short, even with a large length:diameter ratio which is essential for effective adsorption separation. The large number of columns and the rotary distributor valve result in a quasi steady-state gas flow through the compressor and other components which produces a number of advantages and system simplifications. The invention permits optimization of the adsorption cycle by providing the possibility of employing unequal times for the adsorption and desorption phases of the cycle. Prior art two chamber systems are inherently bound to equal times.

Another notable advantage of the invention is the elimination of many components which are necessary in the prior art, thereby, reducing size, weight and the amount of maintenance, concomitantly increasing reliability and maneuverability for the ambulatory patient. These eliminated components include:

Air receiver or surge tank
Four or five solenoid valves (or a 4-way valve and one 2-way solenoid valve)
Electric or electronic sequencing control for the solenoid valves
Pressure reducing regulator
Almost all connecting tubing and fittings The elimination of almost all "plumbing" decreases size and weight, the potential for system leaks and reduces manufacturing costs.

Although the adsorbent material utilized in this embodiment is a synthetic zeolite, there are many other useful adsorbents available; therefore, this invention should not be construed as restricted to its use. It is understood by those well versed in the art that many other configurations are possible while employing the rotary distributor concept, which are within the spirit and scope of this invention.

We claim:

1. An improved process for removing a fluid component of a particular fluid from a stream of a mixture of fluids or a contaminating component from a stream of a single fluid through pressure swing adsorption having a pressurizing phase and a desorbing phase comprising the steps of:
   a. admitting a pressurized fluid mixture into a rotary valve distributor attached to a first, second and third plurality of adsorber columns, each of said plurality of columns having proximal and distal ends;
   b. said rotary valve distributor comprising:
      i. a fluid manifold having fluid channels for receiving said fluid mixture before said adsorbing phase and purging a portion of said fluid mixture after said desorbing phase;
      ii. an immobile port plate having a first and second plurality of openings in fluid communication with said first and second plurality of adsorber columns, said port plate further having an integral inlet channel for a substantially continuous flow of fluid;
      iii. rotatable distributor means in fluid communication with said manifold, said means comprising a rotor shaft having a concentrically shaped portion and an eccentrically shaped portion, and a rotor shoe having at least two inlet ports in fluid communication with and axial symmetry about said integral inlet channel, which inlet ports sequentially pressurize said first plurality of columns as said rotor shoe rotates said pair of inlet ports over said first plurality of openings in said port plate; at least two exhaust ports in axial symmetry with said integral inlet channel which sequentially and simultaneously exhaust reflux fluid carrying the retained portion and emanating from each of said second plurality of columns as said rotor rotates said exhaust port over said second plurality of openings in said port plate; at least two cross-porting channels with two ports each, for connecting two or more columns in said third plurality of columns which are in transition between the pressurizing and desorbing phases, allowing rapid pressure equalization;
   c. sequentially distributing said compressed fluid mixture, by means of a rotating member of said rotary valve distributor, into one or more of said first plurality of columns packed with an adsorbent material selective for the fluid or contaminant to be removed, where said fluid or contaminant is retained and desired product fluid is allowed to pass through to a product tank attached to the distal end of said columns; and d. simultaneously refluxing, under low pressure, a portion of product fluid through one or more of said second plurality of columns, said fluid entering through an orifice at one end of each said column and exiting through the opposite end; and e. simultaneously withdrawing purified product fluid from said product tank as required.

2. A method for fractionating a fluid mixture as described in claim 1, wherein said inlet ports in said rotor shoe are equal in size to said exhaust ports.

3. A method for fractionating a fluid mixture as described in claim 1, wherein said inlet ports in said rotor shoe are unequal in size to said exhaust ports.

4. A method for fractionating a fluid mixture as described in claim 1 wherein said openings in said port plate are non-circular in shape.

5. A method for fractionating a fluid mixture as described in any of claims 1 through 4, wherein said columns have a high length to diameter ratio.

6. A method for fractionating a fluid mixture as described in any one of claims 1-4, wherein said columns contain means to reduce reflux pressure.

7. A method for fractionating a flu mixture as described in any one of claims 1-4, wherein said distributor valve assembly is contained within a bearing housing, said housing being at least partially lined with acoustical attenuating material.

8. A method as in claim 7, wherein said distributor valve assembly and bearing housing are contained within a sealed muffler housing, said housing being at least partially lined with acoustical attenuating material.

9. A method for fractionating a fluid mixture as in any one of claims 1-4, wherein said fluid manifold is formed of more than one layer of material, which layers are stacked to from fluid channels.

10. A method as in claim 9 wherein said manifold is die formed and pierced to form fluid channels.

11. A method as in claim 9 wherein said manifold is embossed to form fluid channels.

12. A method as in any one of claims 1-4, wherein said rotor shaft is seated within said rotor shoe and rotatably retained therein to form a pressure balanced seal.

13. An improved process for removing a fluid component of a particular fluid from a stream of a mixture of fluids or a contaminating component from a stream of a single fluid through pressure swing adsorption having a pressurizing phase and a desorbing phase comprising the steps of:

a. admitting a pressurized fluid mixture into a rotary valve distributor;

b. said rotary valve distributor comprising:

i. a fluid manifold for receiving said fluid mixture and purging said contaminating component;

ii. an immobile port plate having a first, second and third plurality of openings in fluid communication with a first, second and third plurality of columns; said port plate further having an integral inlet channel for a substantially continuous flow of fluid; and iii. rotatable distributor means in fluid communication with said manifold, said means comprising a rotor and rotor shoe having an arcuate distribution port which sequentially pressurizes said first plurality of columns as said rotor shoe rotates said distribution port over said first plurality of openings in said port plate; an arcuate exhaust port which sequentially and simultaneously exhausts fluid carrying the contaminating component and emanating from each of said second plurality of columns as said rotor rotates said exhaust port over said second plurality of openings in said port plate; a cross-porting channel with two ports, each situated between the two arcuate ports, for connecting two columns in said third plurality of columns, which are in transition between the pressurizing and desorbing phases, allowing rapid pressure equalization; said rotor shoe further having an integral exhaust channel for a substantially continuous exhaust of fluid carrying the contaminating component; and c. sequentially distributing said compressed fluid mixture, by means of a rotating member of said rotary valve distributor, into one or more of said first plurality of columns packed with an adsorbent material selective for the fluid or contaminant to be removed, where said fluid or contaminant is retained and desired product fluid is allowed to pass through; and d. simultaneously refluxing, under low pressure, a portion of product fluid through one or more of said second plurality of columns, said fluid entering through an orifice at one end of each said column and exiting through the opposite end and into the atmosphere; and e. simultaneously withdrawing purified product fluid as required.

14. An improved process for removing a fluid component of a particular fluid from a stream of a mixture of fluids or a contaminating component from a stream of a single fluid as recited in claim 13 wherein said adsorbent in step c is a zeolite.

15. An improved process for removing a fluid component of a particular fluid from a stream of a mixture of fluids or a contaminating component from a stream of a single fluid as recited in claim 14 wherein each of said first, second and third plurality of columns contains two or more columns.

16. An apparatus for fractionating a fluid mixture by pressure swing molecular adsorption having a pressurizing phase and a desorbing phase which comprises:

a. a first, second and third plurality of adsorber columns, each having a proximal and distal end and containing molecular adsorption medium for fractionation of a mixture of fluids passed thereinto by separation of said mixture into a portion which passes through one of said first, second and third plurality of columns and exits therefrom during said pressurizing phase as a purified portion, and a portion which is passed through another of said first, second and third plurality of columns and retained by said medium as a retained portion during said desorbing phase;

b. chamber means surrounding the distal ends of said columns, means for receiving and storing said purified portion and a fluid exit port for removal of a first part of said purified portion from said chamber;

c. a distributor valve assembly comprising i. a fluid manifold having fluid channels for receiving said fluid mixture and purging said retained portion;

ii. an immobile port plate having a first, second and third plurality of openings in fluid communication with said columns; said port plate further having an integral inlet channel for a substantially continuous flow of fluid;

iii. rotatable distributor means in fluid communication with said manifold, said means comprising a:
  (1) rotor shaft having concentric and eccentric portions; and,
  (2) a rotor shoe having at least two inlet ports in fluid communication with and in axial symmetry about said integral inlet channel, which inlet ports sequentially pressurize said first plurality of columns as said rotor shoe rotates said pair of inlet ports over said first plurality of openings in said port plate; at least two exhaust ports in axial symmetry about said integral inlet channel which sequentially and simultaneously exhaust reflux fluid carrying the retained portion and emanating from each of said second plurality of columns as said rotor rotates said exhaust port over said second plurality of openings in said port plate; at least two cross-porting channels having two ports each, for connecting two or more columns in said third plurality of columns which are in transition between the pressurizing and desorbing phases, allowing rapid pressure equalization; and, d. means for rotating said rotatable distributor means.

17. An apparatus for fractionating a fluid mixture as described in claim 16, wherein said inlet ports in said rotor shoe are equal in size to said exhaust ports.

18. An apparatus for fractionating a fluid mixture as described in claim 16, wherein said inlet ports in said rotor shoe are unequal in size to said exhaust ports.

19. An apparatus for fractionating a fluid mixture as described in claim 16 wherein said openings in said port plate are non-circular in shape.

20. An apparatus for fractionating a fluid mixture as described in any of the above claims, wherein said columns have a high length to diameter ratio.

21. An apparatus for fractionating a fluid mixture as described in any one of claims 16-19, wherein said columns contain means to reduce reflux pressure.

22. An apparatus for fractionating a fluid mixture as described in claim 21, wherein said means to reduce reflex pressure comprises a small orifice at the end of each column opposite said rotary distributor valve.

23. An apparatus for fractionating a fluid mixture as described in claim 22, wherein said columns are sealed by a mechanical sealing means at the end opposite to the orifice.

24. An apparatus for fractionating a fluid mixture as described in any one of claims 16-19, wherein said distributor valve assembly is contained within a bearing housing, said housing being at least partially lined with acoustical attenuating material.

25. An apparatus as in claim 24, wherein said distributor valve assembly and bearing housing are contained within a sealed muffler housing, said housing being at least partially lined with acoustical attenuating material.

26. An apparatus for fractionating a fluid mixture as described in any one of claims 16-19, wherein a compression spring is situated between said rotor shaft and said rotor shoe.

27. An apparatus for fractionating a fluid mixture as described in any one of claims 16-19, wherein said fluid mixture is air.

28. An apparatus for fractionating a fluid mixture as in any one of claims 16-19 wherein said fluid manifold is formed of more than one layer of material, which layers are stacked to form fluid channels.

29. An apparatus as in claim 28 wherein said manifold is die formed and pierced to form fluid channels.

30. An apparatus as in claim 28 wherein said manifold is embossed to form fluid channels.

31. An apparatus as in any one of claims 16-19, wherein said rotor shaft is seated within said rotor shoe and rotatably retained therein to form a pressure balanced seal.

32. An apparatus for fractionating a fluid mixture by pressure swing molecular adsorption having a pressurizing phase and a desorbing phase which comprises:

a. a first, second and third plurality of adsorber columns, each containing molecular adsorption medium for fractionation of a mixture of fluids passed thereinto by separation of said mixture into a portion which passes through one of said first, second and third plurality of columns and exits therefrom as a purified portion during said pressurizing phase, and another portion which is passed through another of said first, second and third plurality of columns and retained as a retained portion by said medium during said desorbing phase;

b. chamber means containing said columns, means for receiving and storing said purified portion and a fluid exit port for removal of a first part of said purified portion from said chamber;

c. a distributor valve assembly comprising
  i. a fluid manifold for receiving said fluid mixture and purging said retained portion;
  ii. an immobile port plate having a first, second and third plurality of openings in fluid communication with said columns; said port plate further having an integral inlet channel for a substantially continuous flow of fluid; and
  iii. rotatable distributor means in fluid communication with said manifold, said means comprising a rotor and rotor shoe having an arcuate distribution port which sequentially pressurizes said first plurality of columns as said rotor shoe rotates said distribution port over said first plurality of openings in said port plate; an arcuate exhaust port which sequentially and simultaneously exhausts reflux fluid carrying the retained portion and emanating from each of said second plurality of columns as said rotor rotates said exhaust port over said second plurality of openings in said port plate; a cross-porting channel with two ports, each situated between the two arcuate ports, for connecting two columns in said third plurality of columns, which are in transition between the pressurizing and desorbing phases, allowing rapid pressure equalization; said rotor shoe further having an integral exhaust channel for a substantially continuous exhaust of fluid carrying the retained portion; and d. means for rotating said rotatable distributor means and said rotatable exhaust outlet means.

33. An apparatus for fractionating a fluid mixture as described in claim 32, wherein said each of said first, second and third plurality of adsorber columns contains two or more columns.

34. An apparatus for fractionating a fluid mixture as described in claim 32, wherein said columns have a high length to diameter ratio.

35. An apparatus for fractionating a fluid mixture as described in claim 32, wherein said columns contain means to reduce reflux pressure.

36. An apparatus for fractionating a fluid mixture as described in claim 35, wherein said means to reduce reflex pressure comprises a small orifice at the end of each column opposite said connection to said distributor valve manifold.

37. An apparatus for fractionating a fluid mixture as described in claim 36, wherein said columns are sealed by a mechanical sealing means at the end opposite to the orifice.

38. An apparatus for fractionating a fluid mixture as described in claim 32, wherein said columns contain spring means to keep the medium compacted.

39. An apparatus for fractionating a fluid mixture as described in claim 32, wherein said fluid mixture is air.

40. An apparatus for fractionating a fluid mixture as described in claim 32, wherein said chamber means is closed at one end and sealed by said distributor valve assembly at the other end.

41. An apparatus for fractionating a fluid mixture as described in claim 32, wherein said chamber has said fluid exit port for removal of said purified portion located in said fluid manifold.

* * * * *